(12) United States Patent
Yoshida

(10) Patent No.: US 7,387,318 B2
(45) Date of Patent: Jun. 17, 2008

(54) PIPING CONNECTOR

(75) Inventor: Naoki Yoshida, Kanagawa (JP)

(73) Assignee: Piolax Inc., Yokohama-shi, Kanagawa-ken (JP)

( * ) Notice: Subject to any disclaimer, the term of this patent is extended or adjusted under 35 U.S.C. 154(b) by 151 days.

(21) Appl. No.: 10/814,288

(22) Filed: Apr. 1, 2004

(65) Prior Publication Data

US 2004/0178629 A1    Sep. 16, 2004

(51) Int. Cl.
*F16L 37/088* (2006.01)
(52) U.S. Cl. .................................... 285/321
(58) Field of Classification Search ............... 285/321, 285/305
See application file for complete search history.

(56) References Cited

U.S. PATENT DOCUMENTS

| | | | | |
|---|---|---|---|---|
| 3,314,696 A | * | 4/1967 | Ferguson et al. | 285/148.14 |
| 4,423,891 A | * | 1/1984 | Menges | 285/305 |
| 4,640,534 A | * | 2/1987 | Hoskins et al. | 285/143.1 |
| 4,725,081 A | * | 2/1988 | Bauer | 285/305 |
| 4,813,716 A | * | 3/1989 | Lalikos et al. | 285/148.14 |
| 4,874,174 A | * | 10/1989 | Kojima et al. | 285/82 |
| 4,884,829 A | * | 12/1989 | Funk et al. | 285/24 |
| 5,749,606 A | * | 5/1998 | Lu et al. | 285/86 |
| 5,909,901 A | * | 6/1999 | Zillig et al. | 285/38 |
| 5,979,946 A | * | 11/1999 | Petersen et al. | 285/305 |
| 6,371,528 B1 | * | 4/2002 | Kimura | 285/305 |
| 6,474,698 B2 | * | 11/2002 | Dobler et al. | 285/321 |
| 6,554,322 B2 | * | 4/2003 | Duong et al. | 285/305 |
| 6,769,720 B2 | * | 8/2004 | Dahms et al. | 285/308 |
| 6,899,094 B1 | * | 5/2005 | Li | 126/41 R |
| 6,983,958 B2 | * | 1/2006 | Rautureau | 285/305 |
| 6,997,486 B2 | * | 2/2006 | Milhas | 285/305 |
| 2004/0041394 A1 | * | 3/2004 | Dahms et al. | 285/39 |

FOREIGN PATENT DOCUMENTS

| | | | |
|---|---|---|---|
| JP | 10-9470 | | 1/1998 |
| JP | P2003-21287 A | * | 1/2003 |

* cited by examiner

*Primary Examiner*—James M. Hewitt
(74) *Attorney, Agent, or Firm*—McGinn IP Law Group, PLLC

(57) ABSTRACT

A socket is attached to an end of one pipe and a plug is attached to an end of another pipe. The socket is provided with a pair of notched grooves at peripheral faces on both sides opposed to each other and a stopper constituting a U-shape is mounted onto the notched groove. The plug is provided with a first taper portion, a flat portion, and a second taper portion continuously from a front end side thereof in a sectional shape thereof along an axial direction, and a groove having the stopper inserted therein is formed at a ridge portion of the second taper portion. An inner periphery of the socket is arranged with a seal ring for sealing an interval between the inner periphery of the socket and an outer periphery of the plug in an airtight connection.

19 Claims, 6 Drawing Sheets

PIPING CONNECTOR

BACKGROUND OF THE INVENTION

1. Field of the Invention

The present invention relates to a piping connector preferably used in a fluid pipe in, for example, a cooling system or an intake system of an engine of an automobile.

2. Description of the Related Art

In connecting to, for example, a radiator hose or the like of an automobile, there is widely utilized a piping connector (pipe joint) made to be connected in one touch motion by only inserting a plug attached to an end portion of other pipe into a socket attached to an end portion of one pipe.

For example, in JP-A-10-9470, there is disclosed such a piping connector in which an outer peripheral groove is provided at an outer periphery of a female pipe (socket), the outer peripheral grove is provided with notched grooves penetrating inner and outer diameters and opposed to each other by a necessary angle, a stop piece arm (stopper) is engaged with a valley peripheral diameter portion of an unnotched groove portion, respective locking arms extended from the stop piece arm are made to span the respective notched grooves to lock, and portions of the respective locking arms are projected into the female pipe and fit to a groove at an outer periphery of a male pipe (plug).

According to such a piping connector, in order to facilitate the stopper projected to an inner periphery of the socket through the notched groove of the socket to engage with the groove at the outer periphery of the plug, the plug is formed with a taper wall for guiding the stopper to the groove.

A seal ring is arranged between an inner periphery of the socket and an outer periphery of the plug in order to seal in airtight such that a fluid flowing at inside of a pipe does not leak in a state of connecting the connector.

Further, in order to facilitate to insert a front end of the plug into the socket, insert the front end of the plug into the seal ring and fit the stopper to the groove of the plug, the plug is provided with a first taper portion, a flat portion, and a second taper portion continuously from a side of the front end in a sectional shape along an axial direction thereof.

In this case, the first taper portion is operated to facilitate to insert the front end of the plug into the seal ring, the flat portion is arranged with the seal ring at an outer periphery thereof and operated to seal an interval between the outer periphery of the flat portion and the inner periphery of the socket in airtight, and the second taper portion is operated as a guide face for expanding a diameter of the stopper to drop to the groove of the plug.

However, according to the piping connector of the prior art, in a procedure of inserting the plug into the socket, before the seal ring passes a portion of shifting from the first taper portion to the flat portion, the diameter of the stopper is expanded while being brought into contact with the second taper portion and therefore, there poses a problem that an inserting resistance becomes extremely large.

That is, FIG. 5 illustrates an inserting resistance A brought about by the seal ring, and an inserting resistance B brought about by the stopper, and an inserting resistance C as a whole including a total thereof.

When the seal ring passes the portion shifting from the first taper portion to the flat portion, the inserting resistance becomes a curve constituting a peak by a dotted line X in the drawing. When the seal ring rides over the flat portion from the first taper portion, the inserting resistance A is rapidly reduced and finally becomes substantially a constant value.

In contrast thereto, the inserting resistance B in accordance with rise thereof while the stopper is being brought into contact with the second taper portion to expand the diameter, is generated before the inserting resistance A by the seal ring constitutes the peak and is gradually increased and constitutes a peak at a portion thereof indicated by a dotted line Y in the drawing which is slightly retarded from the peak of the inserting resistance A.

As a result, the inserting resistance C as a hole including the total constitutes a peak at a position X substantially overlapping the peak of the inserting resistance A and a magnitude thereof becomes the inserting resistance A+the inserting resistance B at the position X and therefore, the magnitude is considerably increased by adding the both resistances.

Since the inserting resistance is large as described above, the plug needs to be pressed into the socket by a strong force, which may constitute a hindrance when operation is carried out by putting the hand into a narrow gap arranged with an engine of an automobile or the like.

SUMMARY OF THE INVENTION

It is an object of the invention to provide a piping connector for making an inserting resistance in inserting a plug of a connector into a socket to connect as small as possible.

In order to achieve the above-described object, a first of the invention provides a piping connector characterized in being constituted by a socket substantially in a tubular shape attached to an end of one pipe to be connected and a plug substantially in a tubular shape attached to an end of other pipe, wherein the socket is provided with a pair of notched grooves at peripheral faces on both sides opposed to each other, the notched grooves are mounted with a stopper constituting a U-shape, the plug is provided with a first taper portion, a flat portion and a second taper portion continuously from a front end side thereof in a sectional shape thereof along an axial direction thereof, a groove for fitting the stopper is formed at a ridge portion of the second taper portion, an inner periphery of the socket is arranged with a seal ring for sealing an interval between the inner periphery of the socket and an outer periphery of the plug in airtight and in a procedure of inserting the plug into the socket, after the seal ring reaches a radius portion shifting to the flat portion from the first taper portion, the stopper is constituted to be brought into contact with the second taper portion.

According to the invention, when the plug is inserted into the socket, the first taper portion at the front end of the plug is brought into the inner periphery of the seal ring and is made to advance by compressing the seal ring. An inserting resistance thereby becomes a maximum when the seal ring passes the radius portion shifting to the flat portion from the first taper portion.

However, according to the invention, at a time point at which the seal ring reaches the radius portion, the stopper is not brought into contact with the second taper portion yet and therefore, at a time point at which the inserting resistance by the seal ring becomes the maximum, a resistance by the stopper is not generated yet or brought into an extremely small state.

Thereafter, as the seal ring rides on the flat portion, the inserting resistance by the seal ring is rapidly lowered and in place thereof, the stopper is brought into contact with the second taper portion and starts to rise thereon and therefore, the resistance by the stopper is increased. However, a peak of the resistance by the stopper is normally smaller than the peak of the resistance by the seal ring and therefore, the inserting resistance does not become higher than that of the peak of the inserting resistance of the seal ring.

In this way, the peak of the inserting resistance as a whole can be reduced by preventing the inserting resistance by the seal ring and the inserting resistance by the stopper from being overlapped as less as possible.

In a second of the invention provides the piping connector, wherein before the seal ring passes the radius portion to ride on the flat portion, the stopper is constituted to be brought into contact with the second taper portion in the first invention According to the above-described invention, the peak of the inserting resistance by the seal ring and the peak the inserting resistance by the stopper are prevented from being excessively separated from each other in distance and at a time point of passing the peak of the inserting resistance by the seal ring, it can be prevented that an operator erroneously recognizes that the connection has been finished to stop insertion in the midst of connection to bring about connecting failure.

Further, a position at which the seal ring reaches the radius portion and a position at which the stopper is brought into contact with the second taper portion are prevented from being separated from each other more than necessary, thereby, an inserting path required for connection is made to be as short as possible and the connector can be formed compactly.

A third of the invention provides the piping connector, wherein a radius of curvature R of the radius portion in a section of the plug along the axial direction falls in a range of 15 through 50 mm in the first or the second invention.

According to the invention, the peak of the inserting resistance generated in a procedure in which the seal ring passes the radius portion from the first taper portion and rides on the flat portion can be lowered. That is, the smaller the radius of curvature of the radius portion, the higher the inserting resistance of the seal ring and the larger the radius of curvature of the radius portion, the lower the inserting resistance by the seal ring.

Further, by lowering the inserting resistance by the seal ring, the inserting resistance as a whole is lowered, a reduction at an interval between the peak of the inserting resistance by the seal ring and the peak of the inserting resistance by the stopper can be reduced and it can further effectively be prevented that an operator stops insertion in the midst of the connection by erroneously recognizing that the connection has been finished to thereby bring about connecting failure.

BRIEF DESCRIPTION OF THE DRAWINGS

FIG. 1A is a disassembled perspective view, and FIG. 1B is a perspective view showing a connected state.

FIG. 2A is a view showing a state in which a first taper portion starts to be inserted into a seal ring, FIG. 2B is an explanatory view showing a state in which the seal ring passes a radius portion from the first taper portion to ride on a flat portion, and FIG. 2C is an explanatory view showing a state in which the stopper rises on the second taper portion.

FIG. 3A is an enlarged side view of the plug, and FIG. 3B is a diagram showing a relationship between the inserted position and the inserting resistance.

FIG. 4A is an enlarged side view of the plug, FIG. 4B is a diagram showing a relationship between the inserted position and the inserting resistance.

DETAILED DESCRIPTION OF THE PREFERRED EMBODIMENTS

Figure 1A:
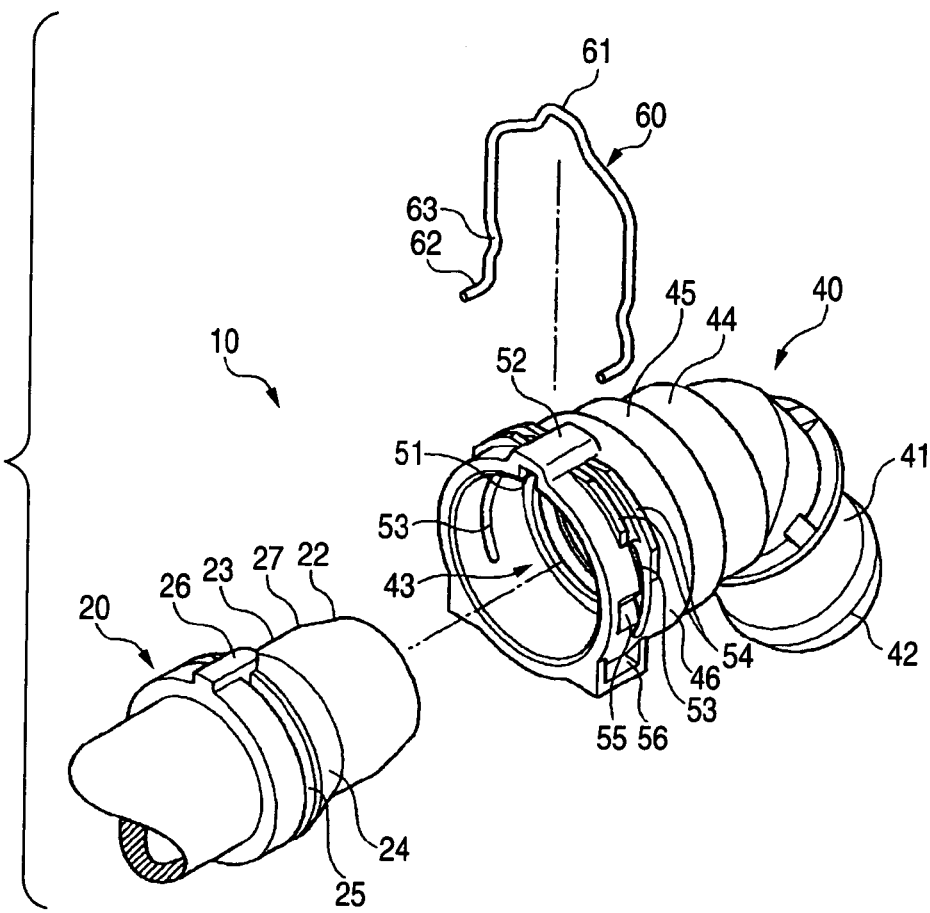
FIGS. 1A and 1B illustrate perspective views of a piping connector according to an embodiment of the invention.
Figure 1B:
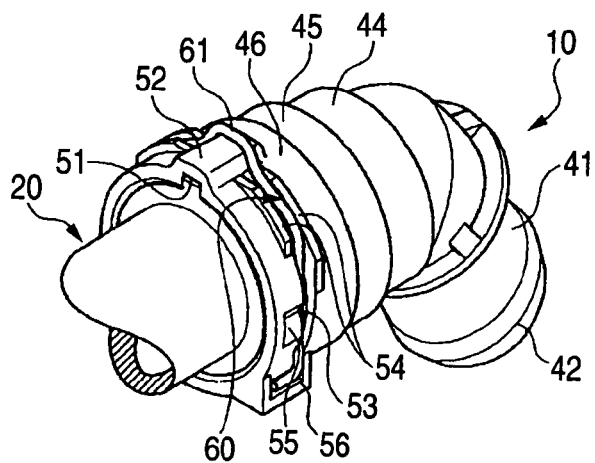
Figure 2A:
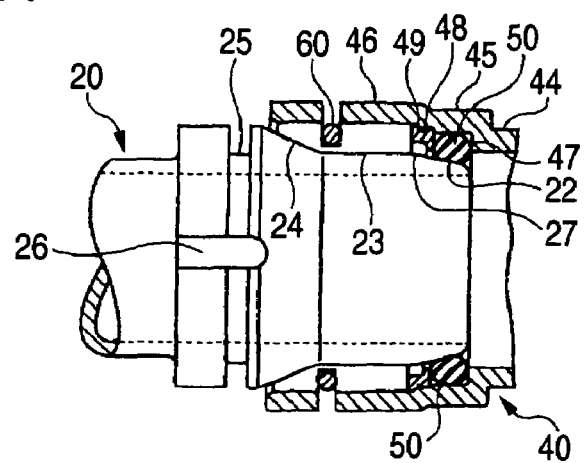
FIGS. 2A to 2C illustrate explanatory views showing a procedure of inserting a plug of the connector into a socket to connect.
Figure 2B:
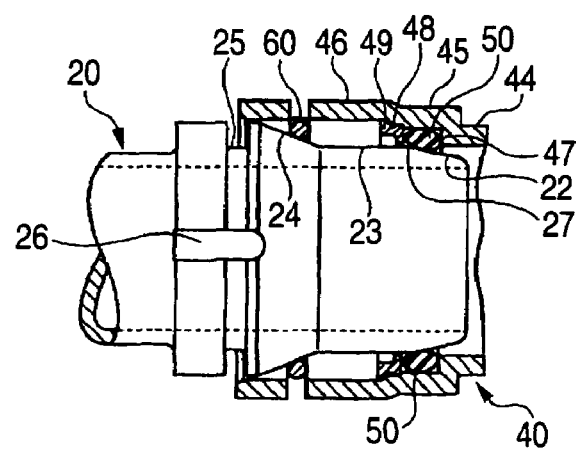
Figure 2C:
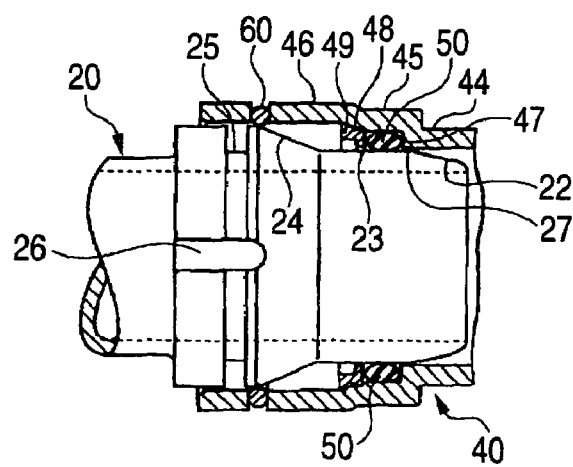
Figure 3A:
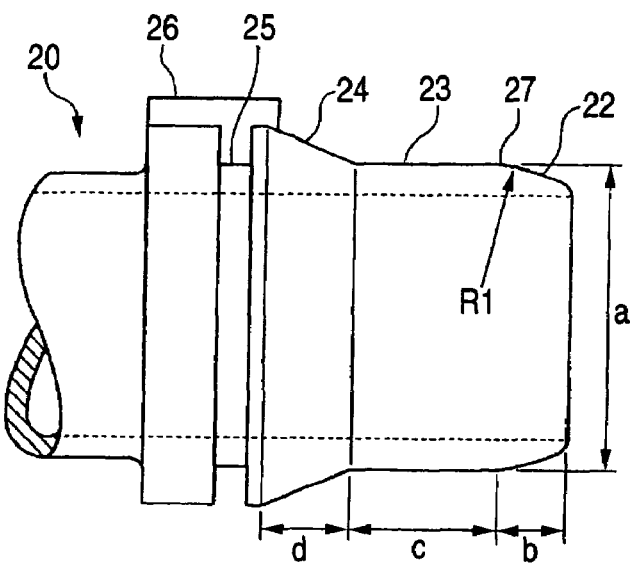
FIGS. 3A and 3B illustrate explanatory views showing a relationship between an inserted position and an inserting resistance of the plugged connector.
Figure 3B:
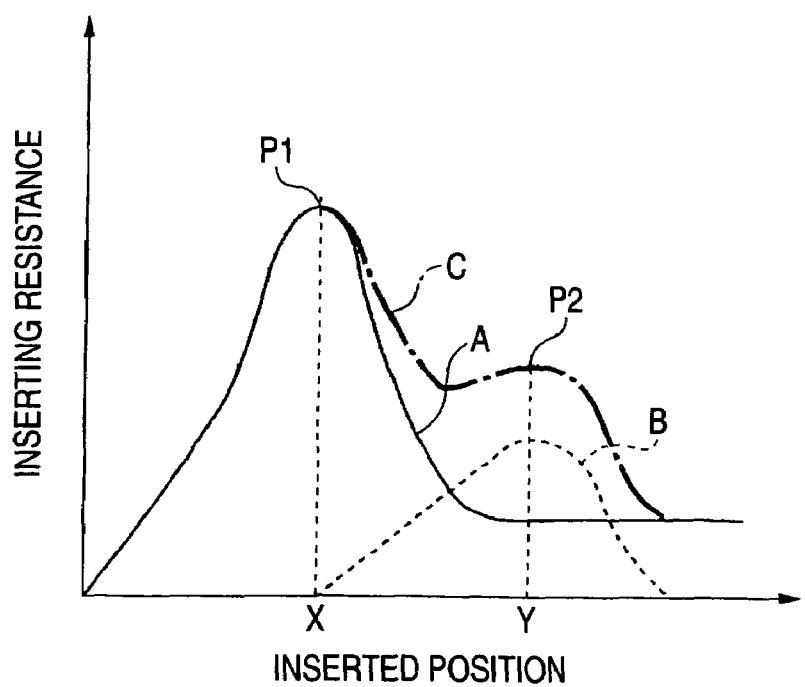

FIGS. 1A through 3B show an embodiment of a piping connector of the invention. FIGS. 1A and 1B illustrate perspective views of the connector, FIG. 1A is a disassembled perspective view, FIG. 1B is a perspective view showing a connected state, FIGS. 2A to 2C illustrate explanatory views showing a procedure of inserting a plug of the connector into a socket to connect, FIG. 2A is a view showing a state in which a first taper portion starts to be inserted into a seal ring, FIG. 2B is an explanatory view showing a state in which the seal ring passes a radius portion from the first taper portion to ride over the flat portion, FIG. 2C is an explanatory view showing a state in which a stopper rises on a second taper portion, FIGS. 3A and 3B illustrate explanatory views showing a relationship between an inserted position and an inserting resistance of the plugged connector, FIG. 3A is an enlarged side view of the plug, and FIG. 3B is a diagram showing a relationship between the inserted position and the inserting resistance.

As shown by FIGS. 1A and 1B, the connector 10 is constituted by a plug 20 attached to an end portion of one pipe to be connected, a socket 40 attached to an end portion of other pipe, and a stopper 60 mounted to the socket 40 and formed by a bent wire.

The socket 40 is provided with an attaching port 41 connected with other pipe to be connected, not illustrated, for example, a hose, a tube or the like at one end thereof and is provided with an inserting port 43 for receiving the plug 20 at other end thereof. The attaching port 41 is formed to bend by an angle of about 60 degrees relative to a socket main body portion to extend. A front end portion of the attaching port 41 is formed with a rib 42 in a ring-like shape to enhance an effect of preventing the pipe to be connected from being drawn.

The main body portion of the socket 40 constitutes a cylindrical shape in a size and in a shape for receiving the plug 20. Also particularly as shown by FIG. 2B, the main body portion of the socket 40 constitutes a shape for expanding a diameter thereof in steps and is provided with a first diameter expanded portion 44 having an inner diameter slightly expanded from the portion of being connected to the attaching port 41, a second diameter expanded portion 45 an inner diameter of which is slightly expanded from the first diameter expanded portion 44 and a third diameter expanded portion 46 a diameter of which is further expanded from the second diameter expanded portion 45.

As shown by FIGS. 2A to 2C, at an inner periphery of the socket 40, a stepped portion 47 is formed between the first diameter expanded portion 44 and the second diameter expanded portion 45 and a stepped portion 48 formed between the second diameter expanded portion 45 and the third diameter expanded portion 46. Further, the stepped portion 48 is mounted with a hold ring 49 having a section in an L-like shape and formed in a ring-like shape.

Further, the seal ring 50 is installed at a groove in a ring-like shape formed between the stepped portion 47 and the hold ring 49. That is, the seal ring 50 is held at a predetermined position by the stepped portion 47 and the hold ring 49. Further, the hold ring 49 is mounted to the inner periphery of the socket 40 by means of welding, adhering or the like.

In reference to FIGS. 1A and 1B again, the third diameter expanded portion 46 of the socket 40 is formed with a guide groove 51 for inserting the positioning projection of the plug 20, mentioned later, and an outer periphery of the guide groove 51 constitutes a wall portion 52 which is bulged partially.

The third diameter expanded portion 46 is formed with a notched groove 53 for inserting the stopper 60. The notched groove 53 is formed in a slit-like shape to penetrate inside and outside of the socket 40 along portions opposed to each other in a peripheral direction of the third diameter expanded portion 46.

An upper half portion of the notched groove 53 at the outer periphery of the third diameter expanded portion 46 is formed with a pair of ribs 54 projected from edge portions of the notched groove 53 opposed to each other and the ribs 54 pinches the stopper 60 to firmly hold. Further, a middle portion of the notched groove 53 at the outer periphery of the third diameter expanded portion 46 is formed with a recess portion 55 having a section in a V-like shape along the peripheral direction. Further, a lower end of the notched groove 53 at the outer periphery of the third diameter expanded portion 46 is formed with a containing recess portion 56 formed by a wall in a channel-like shape for containing an end portion of the stopper 60.

The stopper 60 is constituted by a wire or the like bent in a U-shape as a whole. A center portion of the stopper 60 is formed with an outwardly bent portion 61 matched to the outer periphery of the bulged wall portion 52. Both end portions of the stopper 60 are formed with forwardly bent portions 62 bent by substantially 90° to a side of the inserting port 43. Further, a portion of the stopper 60 slightly proximate to the base portion from the forwardly bent portion 62 is formed with an inwardly bent portion 63 bent to an inner side in a shape of a circular arc.

In mounting the stopper 60 to the socket 40, first, the stopper 60 is covered thereon from an upper side while widening the both end portions of the stopper 60 and while inserting the stopper 60 into the notched grooves 53 of the socket 40. Then, the forwardly bent portion 62 of the stopper 60 is fit to the recess portion 55 in the V-like shape at the outer periphery of the socket 40 and is tackedly held thereby. When the stopper 60 is further pressed strongly to a lower side under the state, the both end portions of the stopper 60 are slid while being widened further and the forwardly bent portions 62 are fit to the containing recess portions 56.

At this occasion, the both end portions of the stopper 60 are inserted into the notched grooves 53 of the socket 40, portions thereof are brought into a state of being projected from the inner periphery of the notched groove 53 to the inner side, particularly, the inwardly bent portions 63 are considerably projected to the inner side. At this occasion, each of the end portions of the stopper 60 traverses a circumference of the notched groove 53 as in a chord and is intersected with the notched groove 53 at two upper and lower portions thereof and the inwardly bent portion 63 is formed at a lower side intersected portion thereof.

Meanwhile, as shown by FIGS. 2A to 2C, 3A and 3B the plug 20 constitutes a structure constituting a shape continuously formed with a first taper portion 22, a straight portion 23, and a second taper portion 24 from a front end side thereof in a section along an axial direction thereof and formed with a ring-like groove portion 25 and a positioning projection 26 at an outer periphery of a ridge portion of the second taper portion 24. Further, a radius portion 27 constituted by a predetermined radius of curvature R1 is provided at a portion of shifting from the first taper portion 22 to the straight portion 23.

Figure 6A:
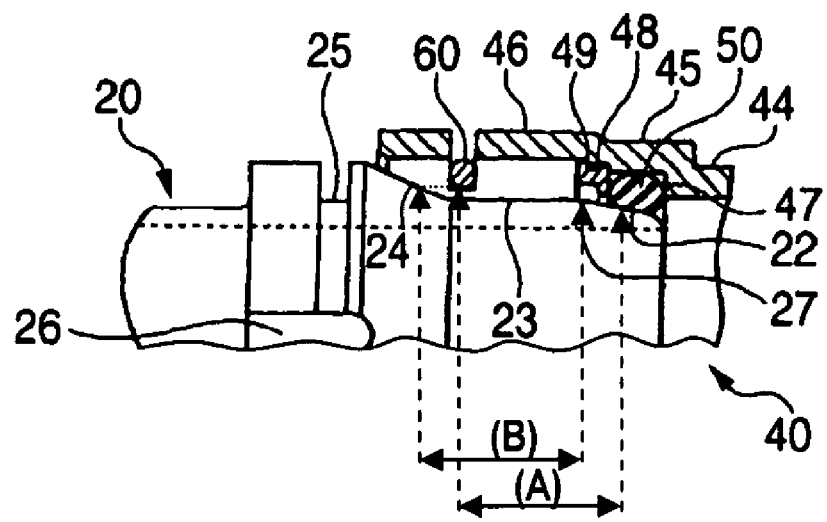
FIGS. 6A and 6B illustrate explanatory views showing the procedure of inserting a plug of the connector into a socket to connect corresponding to FIG. 2A and FIG. 2B, respectively, and further detail the distance between a plug contacting portion of the stopper and a plug contacting portion of a seal ring, and the distance between an initial stopper contacting portion of the plug and an initial seal ring contacting portion on a radius portion of the plug between a flat portion and a taper portion.

FIG. 6A further illustrates the details of FIG. 2A by denoting a first distance (A) between the plug 20 contacting portion of the stopper 60 and the plug 20 contacting portion of the seal ring 50. Another distance (B) is denoted between an initial stopper 60 contacting portion of the plug 20 and the initial seal ring 50 contacting portion on the radius portion 27.

Figure 6B:
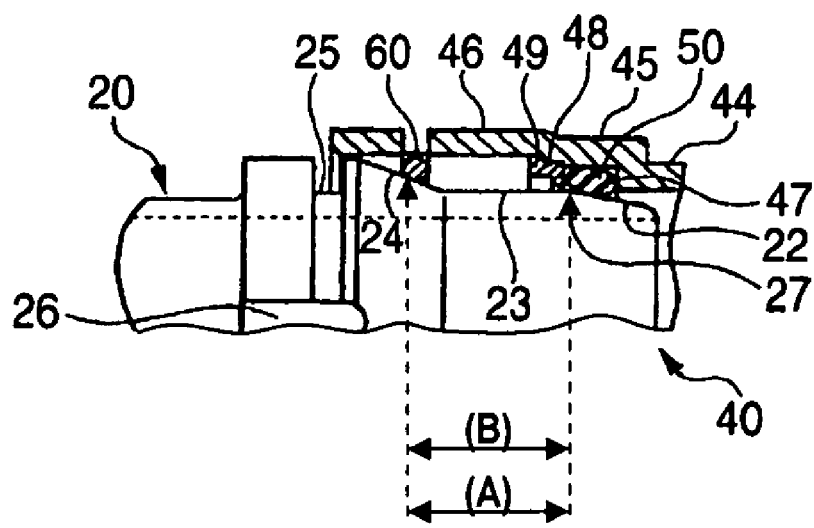

FIG. 6B further illustrates the details of FIG. 2B when the first distance (A) between the plug 20 contacting portion of the stopper 60 and a plug 20 contacting portion of the seal ring 50 is equal to the other distance (B) between an initial stopper 60 contacting portion of the plug 20 and an initial seal ring 50 contacting portion on the radius portion 27.

In FIG. 3A, it is preferable that the radius of curvature R1 of the radius portion 27 is 15 through 50 mm. Further, an outer diameter a of the plug 20 is preferably 30 through 35 mm, a distance b from the front end of the plug 20 to a center of the radius portion 27 is preferably 8 through 9 mm, a distance c from the center of the radius portion 27 to a boundary between the flat portion 23 and the second taper portion 24 is preferably 12 through 16 mm, and a distance d from a start end to a final end of the second taper portion 24 is preferably 10 through 12 mm. Incidentally, all of the distances b, c, d are distances in the axial direction. According to the embodiment, the radius of curvature R1 of the radius portion 27 is set to 30 mm, the distance b is set to 8.5 mm, the distance c is set to 14.4 mm and the distance d is set to 10.4 mm.

Further, the first diameter expanded portion 44 of the socket 40 constitutes an inner diameter for inserting the first taper portion 22 and the straight portion 23. The seal ring 50 arranged at the second diameter expanded portion 45 of the socket 40 is constituted by an inner diameter brought into close contact with the straight portion 23. Further, the third diameter expanded portion 46 of the socket 40 is constituted by an inner diameter capable of containing the second taper portion 24, the ring-like groove portion 25, the positioning projection 26 and the like of the plug 20. Further, the positioning projection 26 is inserted into the guide groove 51 to thereby restrict an angle of integrating the plug 20 and the socket 40.

Next, an explanation will be given of operation of the connector 10.

When the plug 20 is inserted into the socket 40 while inserting the positioning projection 26 of the plug 20 into the guide groove 51 of the socket 40, first, the first taper portion 22 of the plug 20 is brought into contact with inside of the seal ring 50 arranged at inside of the socket 40 and the plug 20 is pressed thereto while pressing the seal ring 50 to an inner wall of the socket 40. A state at this occasion is shown by FIG. 2A and corresponds to a position at which the inserting resistance A of FIG. 3B rises from 0.

Further, in a procedure in which the radius portion 27 formed between the first taper portion 22 and the flat portion 23 of the plug 20 is inserted in to the inner periphery of the seal ring 50 and the seal ring 50 passes the radius portion, the inserting resistance A by the seal ring 50 reaches a peak. A state at this occasion is shown by FIG. 2B and corresponds to a point X of FIG. 3B.

According to the embodiment, at the point X at which the inserting resistance A reaches the peak, the stopper 60 is brought into contact with the second taper portion 24. Further, when the inserting resistance A passes the peak, in this case, the inserting resistance B rises by rise of the stopper 60 on the second taper portion 24.

As shown by FIG. 2C, a state in which the stopper 60 has finished to rise on the second taper portion 24 corresponds to a point Y on FIG. 3B and at this occasion, the inserting resistance B reaches a peak. Thereafter, the stopper 60 is dropped to the groove 25 of the plug 20 to fit and connection between the plug 20 and the socket 40 is finished.

As a result, the inserting resistance C as a whole constituted by adding the inserting resistance A and the inserting resistance B reaches a highest first peak P1 at the inserted position X, thereafter, the inserting resistance C is slightly lowered and rises again and reaches a second peak P2 lower than the first peak P1 at the inserted position Y and thereafter, lowered to become a constant level. Further, since at the highest first peak P1, the inserting resistance B by the stopper 60 does not rise yet, the first peak P1 as a whole becomes substantially the same as the peak of the inserting resistance A and the peak as the whole can be lowered.

Therefore, operation of connecting the connector 10 can be facilitated by reducing the inserting resistance in inserting the plug 20 to the socket 40.

Figure 4A:
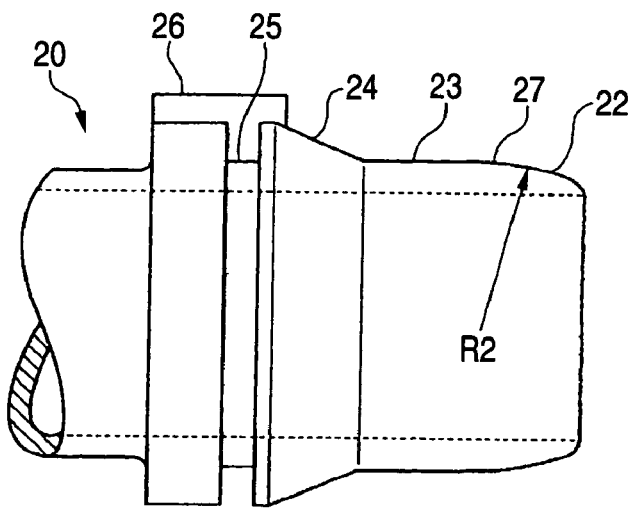
FIGS. 4A and 4B show other embodiment of a connector according to the invention.
Figure 4B:
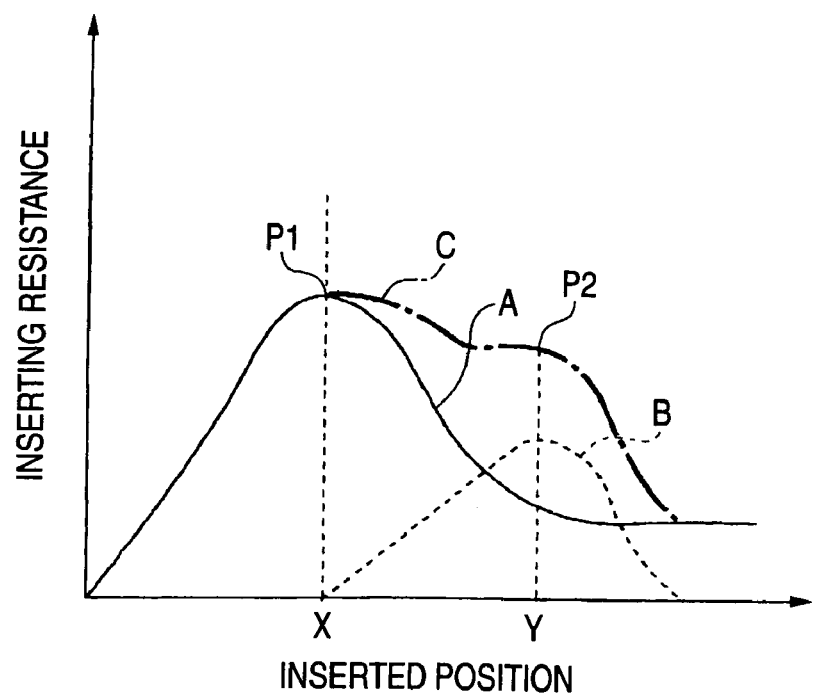
Figure 5:
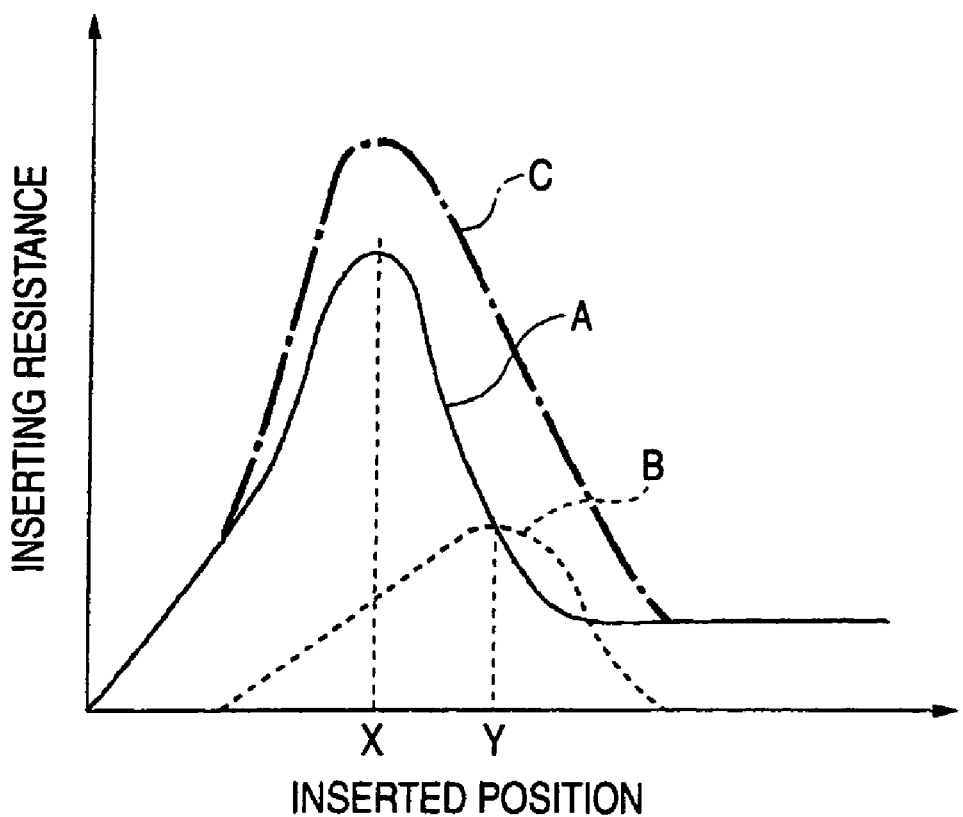
FIG. 5 is a diagram showing a relationship between an inserted position and an inserting resistance of a connector according to an example of a prior art.

FIGS. 4A and 4B shows other embodiment of a connector according to the invention, FIG. 4A is an enlarged side view of the plug and FIG. 4B is a diagram showing a relationship between the inserted position and the inserting resistance.

The embodiment differs from the above-described embodiment in that a radius of curvature R2 of the radius portion 27 of the plug 20 is prolonged to 50 mm and the other structure is basically the same as that of the above-described embodiment.

Further, as shown by FIG. 4B, by taking the radius of curvature R2 of the radius portion 27 of the plug 20 to be large, the peak of the inserting resistance A by the seal ring 50 is lowered and foot portions before and after the peak are widened. Further, the inserting resistance B by the stopper 60 starts to rise when the inserting resistance A reaches the peak similar to the above-described embodiment.

As a result, according to the inserting resistance C as a whole constituted by adding the inserting resistance A and the inserting resistance B, the first peak P1 becomes lower than that of the above-described embodiment, further, the foot portions before and after the first peak P1 are widened, the second peak P2 caused by the inserting resistance B by the stopper 60 becomes proximate to the first peak P1 and therefore, a valley portion between the first peak P1 and the second peak P2 is averaged to be small.

Therefore, according to the embodiment, the peak of the inserting resistance C as a whole is further lowered and the valley portion between the first peak P1 and the second peak P2 almost vanishes. As a result, the connector 10 can be connected easily by comparatively weak force, the valley portion after passing the first peak, that is, a reduction in the inserting resistance in the midst of insertion is hardly present and therefore, it can firmly be prevented that insertion is stopped by erroneously recognizing that the connection has been finished in the midst of insertion to thereby bring about connecting failure.

Further, although contact of the stopper 60 to the second taper portion 24 may be carried out after the seal ring 50 reaches the radius portion 27, it is further preferable that the contact is carried out until the seal ring 50 rides on the flat portion 23. Thereby, the valley portion between the first peak P1 and the second peak P2 can be reduced and the connector 10 can compactly be formed by shortening a length in the axial direction of the plug 20 and the socket 40.

Further, in the above-described, a position at which the seal ring 50 reaches the radius portion 27 signifies a position at which the seal ring 50 starts to be brought into contact with the radius portion 27 from the first taper portion 22. Further, a position at which the seal ring 50 rides on the flat portion 23 signifies a position at which the inserting resistance A by the seal ring 50 passes the peak and is lowered to be the constant value.

As has been explained above, according to the invention, the peak of the inserting resistance as a whole can be reduced by preventing the inserting resistance by the seal ring and the inserting resistance by the stopper from being overlapped as less as possible.

What is claimed is:

1. A piping connector comprising:
    a socket in a tubular shape for attaching to an end of one pipe; and
    a plug in a tubular shape for attaching to an end of an other pipe, wherein,
    the socket comprises a pair of notched grooves at opposite peripheral sides, the notched grooves are mounted with a stopper comprising a U-shape,
    the plug comprises a first taper portion, a flat portion and a second taper portion extending respectively from a front end side and along an axial direction of the plug, and a groove for fitting the stopper being formed at a ridge portion of the second taper portion, and
    an inner periphery of the socket is arranged with a seal ring for sealing between the inner periphery of the socket and an outer periphery of the plug in an airtight connection,
    wherein a first distance in the axial direction of the plug between a plug contacting portion of the stopper and a plug contacting portion of the seal ring, is equal to or less than a second distance in the axial direction of the plug between an initial stopper contacting portion of the plug and an initial seal ring contacting portion on a radius portion on the plug between the flat portion and the first taper portion.

2. The piping connector according to claim 1, wherein before the seal ring passes the radius portion to ride on the flat portion, the stopper is in contact with the second taper portion.

3. The piping connector according to claim 1, wherein a radius of curvature R of the radius portion in a section of the plug along the axial direction comprises a range of 15 through 50 mm.

4. The piping connector according to claim 1, wherein an inner peripheral edge of the socket comprises:
    a first stepped portion formed between a first diameter expanded portion and a second diameter expanded portion; and a second stepped portion formed between the second diameter expanded portion and a third diameter expanded portion.

5. The piping connector according to claim 4, wherein the second stepped portion being mounted with a hold ring, the hold ring having an L-shaped cross-section.

6. The piping connector according to claim 5, wherein the seal ring is mounted and held at a predetermined position between the hold ring and the first stepped portion on the inner peripheral edge of the socket.

7. The piping connector according to claim 6, wherein the hold ring is mounted to the inner periphery of the socket by permanent attachment means.

8. The piping connector according to claim 4, wherein an upper half portion of each of the notched grooves at an outer peripheral edge of the third diameter expanded portion comprises a pair of opposing ribs projecting from edge portions of the notched grooves, and wherein the pair of opposing ribs retains the stopper.

9. The piping connector according to claim 4, wherein a middle portion of the pair of notched grooves at an outer peripheral edge of the third diameter expanded portion comprises a recess portion along a peripheral direction.

10. The piping connector according to claim 4, wherein a lower end of the pair of notched grooves at an outer peripheral edge of the third diameter expanded portion comprises a channel-shaped recess portion for containing an end portion of the stopper.

11. The piping connector according to claim 1, wherein an inner peripheral edge of the socket comprises:
    a stepped portion mounted with a hold ring, the hold ring having an L-shaped cross-section.

12. The piping connector according to claim 11, wherein the seal ring is mounted and held at a predetermined position between the hold ring and a second stepped portion on the inner peripheral edge of the socket.

13. The piping connector according to claim 12, wherein the hold ring is mounted to the inner periphery of the socket by permanent attachment means.

14. The piping connector according to claim 1, wherein an upper half portion of each of the notched grooves at an outer peripheral edge of the socket comprises a pair of opposing ribs projecting from edge portions of the notched grooves, and wherein the pair of opposing ribs retains the stopper.

15. The piping connector according to claim 1, wherein a middle portion of the pair of notched grooves at an outer peripheral edge of the socket comprises a recess portion along a peripheral direction.

16. The piping connector according to claim 1, wherein a lower end of the pair of notched grooves at an outer peripheral edge of the socket comprises a channel-shaped recess portion for containing an end portion of the stopper.

17. The piping connector according to claim 1, wherein the stopper further comprises:
    a forward bent portion at a base portion of the stopper; and
    an arc-shaped inwardly bent portion proximate to the base portion of the stopper formed on an inner side of the stopper.

18. A method of connecting a piping connector, said piping connector comprising a socket containing a seal ring fixably attached to an inner periphery of said socket, a stopper, and a plug comprising a first tapered portion, a radius portion, a flat portion, a second tapered portion and a notch portion for engaging said stopper, all of said plug portions extending respectively from a front end of said plug, the method of connecting comprising:
    inserting said plug into said stopper;
    engaging said first tapered portion of said plug with said seal ring attached to said socket; and
    sliding said plug into said stopper such that after said seal ring reaches the radius portion of said plug, the stopper initially makes engaging contact with the plug.

19. The method of connecting a piping connector according to claim 18, further comprising:
    sliding said plug into said stopper such that before said seal ring passes the radius portion, the stopper is in engaging contact with the second taper portion.

* * * * *